Oct. 14, 1969    R. H. TAYLOR    3,472,120
LOOPED CABLE WEDGE-TYPE EYEBOLT
Filed June 3, 1968

INVENTOR.
Raymond H. Taylor
BY Webster & Webster
ATTYS.

United States Patent Office 3,472,120
Patented Oct. 14, 1969

3,472,120
LOOPED CABLE WEDGE-TYPE EYEBOLT
Raymond H. Taylor, P.O. Box 122,
Big Pine, Calif. 93513
Filed June 3, 1968, Ser. No. 734,050
Int. Cl. F16b 13/04
U.S. Cl. 85—79          3 Claims

ABSTRACT OF THE DISCLOSURE

An eyebolt of the type which includes a rigid shank adapted to be wedge-secured in a preformed hole in a rock wall or the like; the shank having a full-length longitudinal bore through which extends side-by-side runs of a cable bent double to form an eye ahead of the outer end of the shank, and a stop connecting the cable runs at the end opposite the eye, and such stop abutting the inner end of the shank. To enable the cable runs to be easily placed in, or removed from the bore of the shank, the latter is comprised of two longitudinal parts normally but separably engaged in a plane which bisects such bore.

BACKGROUND OF THE INVENTION

The present invention represents an improvement over the wedge-type eyebolt shown in United States Patent No. 3,338,128, and in my copending application Ser. No. 674,856, filed Oct. 12, 1967; the instant improvement having been conceived by me in the continuing development—both as regards efficiency and cost of manufacture—of eye bolts of the above general type.

SUMMARY OF THE INVENTION

The present invention provides, as a major object, a wedge-type eyebolt—which embodies a wedge-secured shank having a full-length longitudinal bore therethrough—characterized by the inclusion of a cable bent double to provide an eye ahead of the outer end of the shank and side-by-side cable runs extending through the bore, and said runs at the end opposite the eye being connected by a stop which abuts the inner end of the shank; the latter comprising two longitudinal halves normally but separably engaged in a plane which bisects such bore.

The present invention provides, as an additional object, a looped cable wedge-type eyebolt, as above, having removable spring bands which normally maintain the longitudinal halves of the shank in matching engagement and against accidental separation when, for example, the eyebolt is being transported, or manipulated to place the same in or remove it from a preformed hole.

The present invention provides, as another object, a looped cable wedge-type eyebolt wherein—by reason of the particular form of said cable and the shank with separable halves—the cable, which is of inexpensive construction, can be readily removed from the shank and replaced when necessary.

The present invention provides, as a further object, a looped cable wedge-type eyebolt which is designed for ease and economy of manufacture, and convenience of use.

The present invention provides, as a still further object, a practical, reliable, and durable looped cable wedge-type eyebolt and one which is exceedingly effective for the purpose for which is designed.

BRIEF DESCRIPTION OF THE DRAWINGS

FIG. 2 is a sectional elevation of such eyebolt, shown as wedge-secured in a hole drilled in a rock wall or the like.

DESCRIPTION OF THE PREFERRED EMBODIMENT

Figure 1:
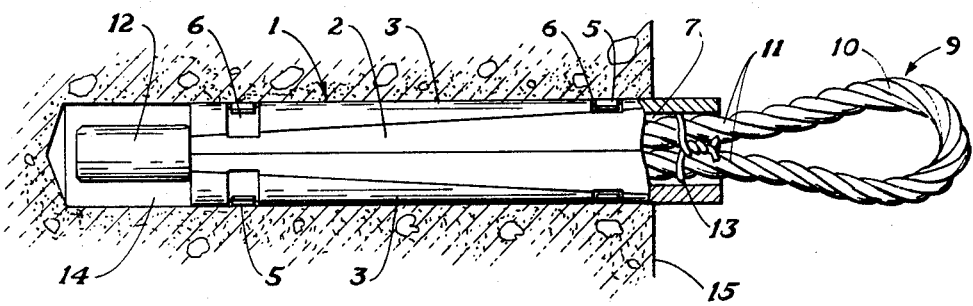
FIG. 1 is a top plan view of the improved eyebolt, partly in section.
Figure 2:
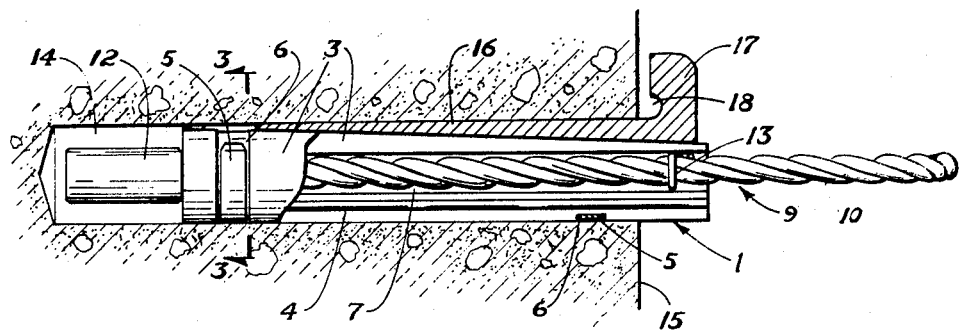
Figure 4:
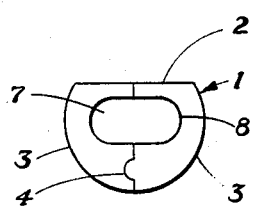
FIG. 4 is an end view of the shank, looking at the small end thereof.
Figure 3:
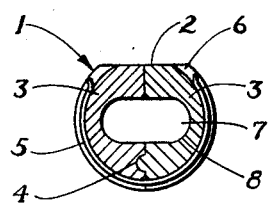
FIG. 3 is a cross section of the shank of the eyebolt, taken on line 3—3 of FIG. 2; the cable runs being omitted from said view.

Referring now more particularly to the drawings and to the characters of reference marked thereon, the imprived eyebolt comprises a rigid elongated shank, indicated generally at 1, of generally cylindrical form; the top or uppermost surface 2, however, being flat and sloping or tapering downwardly toward the outer or forward end of the shank, while the remaining and cylindrical portion of the shank is of constant diameter throughout.

The shank 1 is made of two substantially identical, matching halves 3; the plane of the split being vertical and passing through the axis of the cylindrical contour of the shank.

In order to maintain the shank halves 3 in alinement, they are provided—toward the bottom and along the line of split—with a cooperating longitudinal rib and groove arrangement 4 which extends the full length of the shank parallel to said bottom thereof.

Also, to prevent accidental lateral separation of the shank halves 3, they are engaged—about their cylindrical portions—by stiff, separated-end spring bands 5 which terminate short of the flat surface 2; such spring bands being removably seated in matching grooves 6 in said shank halves.

The shank 1 is formed with a full-length longitudinal bore 7 located between the rib and groove arrangement 4 and the flat surface 2; such bore being parallel to the bottom of the shank. The bore 7 is relatively wide, and the opposed sides are rounded as shown at 8.

To provide the desired looped cable for engagement in the shank, a length of cable 9 is bent double, i.e. doubled over centralled of its ends to form a loop or eye 10 of sufficient size for engagement by a hook; the remainder of the cable providing two side-by-side runs 11 somewhat longer than the shank. At the end opposite the loop, the cable runs 11 are firmly pressed together and fixedly confined in a relatively short enlarged stop 12, which is of greater diameter than the height of the bore 7.

The size and shape of said bore is sufficient to receive the two side-by-side cable runs 11 and in which bore said runs are normally disposed. More particularly, the cable unit comprised of side-by-side cable runs 11 is closely received in the relatively wide bore 7 in generally matching, non-rotatable relation as is desirable to maintain the eye 10 in a predetermined fixed position. Adjacent the base of eye 10 the cable runs 11 are tied together by a wire 13.

The length of the runs 11 of the cable 9 is such that when the stop 12 abuts the inner end of shank 1, the eye 10 is disposed close to but ahead of the outer end of the shank, as shown in FIG. 1.

With the cable runs 11 in place in the bore 7 of the shank, with stop 12 against its inner end and eye 10 ahead of the outer end, the shank is slid, flat side up, into a hole 14 pre-drilled in a rock wall 15 or the like. A longitudinally tapering wedge 16 is then engaged with the flat surface 2 of the shank and thence forcefully driven along the shank until said wedge tightly engages the upper wall of the hole 14. This binds the shank, and consequently the entire eye bolt, positively in place in the hole 14.

In order to aid in loosening the wedge 16 when it is desired to remove the eyebolt from the hole, said wedge is formed at its outer end with an exposed, upstanding head 17 (which also serves as a drive head when the wedge is being driven into place) formed with a transverse, rounded notch 18 in the inner face of such head; such notch receiving an element of a wedge puller (not shown).

When it is desired to replace the cable 9, it is only necessary that the spring bands 5 be removed from the shank 1, whereupon the shank halves 3 are readily separated and the used cable withdrawn therefrom. The new cable is then encompassed by the shank halves as they are again brought together in matching relation, whereupon the spring bands 5 are reapplied to hold said shank halves together as a unit.

From the foregoing description, it will be readily seen that there has been produced such a looped cable wedge-type eyebolt as substantially fulfills the objects of the invention, as set forth therein.

While this specification sets forth in detail the present and preferred construction of the looped cable wedge-type eyebolt, still in practice such deviations from such detail may be resorted to as do not form a departure from the spirit of the invention.

I claim:

1. An eyebolt of the type which comprises a shank having a longitudinal bore full-length therethrough, a wedge adapted to secure the shank in a hole formed in a solid wall, and a cable unit extending through the entire bore and having an eye at the outer end of the shank and a stop at the inner end of said shank; characterized by the cable unit, between the eye and the stop, being of substantially greater width than thickness, such greater width being in the plane of the eye, and the bore in the shank being correspondingly relatively wide and formed to receive the cable unit therein in close, generally matching, non-rotatable relation.

2. An eyebolt, as in claim 1, in which the shank is planar on top and tapers toward its outer end, and the wedge engages between the top of the shank and the adjacent wall of the hole; characterized by the bore being disposed with the width thereof extending in a direction parallel to the top of the shank transversely of the latter.

3. An eyebolt, as in claim 1, in which the shank is planar on top and tapers toward its outer end, and the wedge engages between the top of the shank and the adjacent wall of the hole, said shank being comprised of initially separate longitudinal members engaged in matching relation with the plane of the split bisecting the bore; characterized by longitudinally spaced, separated-end, arcuate spring bands detachably engaging about the shank and embracing both of said members to normally prevent separation thereof, and said spring bands being circumferentially dimensioned and disposed so that their ends lie short of the wedge-engaged top of the shank.

References Cited
UNITED STATES PATENTS

| | | | |
|---|---|---|---|
| 689,326 | 12/1901 | Sands | 287—80 |
| 780,958 | 1/1905 | Palmer | 85—79 |
| 1,154,580 | 9/1915 | Fawkes | 85—88 |
| 1,598,701 | 9/1926 | Bell | 24—123.1 |
| 3,216,306 | 11/1965 | Taylor | 85—79 |
| 3,338,128 | 8/1967 | Taylor | 85—79 |

MARION PARSONS, Jr., Primary Examiner

U.S. Cl. X.R.

85—88; 287—80